(12) United States Patent
Gugler et al.

(10) Patent No.: US 11,820,356 B2
(45) Date of Patent: Nov. 21, 2023

(54) SYSTEM AND METHOD FOR FORCE COMPENSATION IN A ROBOTIC DRIVING SYSTEM

(71) Applicant: Humanetics Austria GmbH, Linz (AT)

(72) Inventors: Jürgen Gugler, Ulmerfeld (AT); Patrick Hofmanninger, Gaspoltshofen (AT)

(73) Assignee: Humanetics Austria GmbH, Linz (AT)

( * ) Notice: Subject to any disclaimer, the term of this patent is extended or adjusted under 35 U.S.C. 154(b) by 418 days.

(21) Appl. No.: 17/125,519

(22) Filed: Dec. 17, 2020

(65) Prior Publication Data
US 2021/0188239 A1      Jun. 24, 2021

Related U.S. Application Data

(60) Provisional application No. 62/951,153, filed on Dec. 20, 2019.

(51) Int. Cl.
*B60W 10/20* (2006.01)
*B60W 10/04* (2006.01)
(Continued)

(52) U.S. Cl.
CPC ............ *B60W 10/20* (2013.01); *B60W 10/04* (2013.01); *B62D 5/0463* (2013.01); *B60W 30/12* (2013.01);
(Continued)

(58) Field of Classification Search
CPC ...... B60W 10/20; B60W 10/04; B60W 30/12; B60W 30/18145; B60W 30/18163;
(Continued)

(56) References Cited

U.S. PATENT DOCUMENTS 4,418,931 A   12/1983  Howard
4,771,846 A    9/1988  Venable et al.
(Continued)

FOREIGN PATENT DOCUMENTS

CN    204269382 U    4/2015
CN    103935395 B    1/2016
(Continued)

OTHER PUBLICATIONS

4activesystems GMBH, "Product Brochure", https://www.4activesystems.at/wp-content/uploads/2020/12/20121601_ms1a_stru_act_Datasheet-Katalog-V.2.0.pdf, 2020, 25 pages.
(Continued)

*Primary Examiner* — Jonathan M Dager
*Assistant Examiner* — Jean W Charleston
(74) *Attorney, Agent, or Firm* — Howard & Howard Attorneys PLLC

(57) ABSTRACT

The present disclosure is generally directed to a system and method of compensating for any forces induced by components of a robotic driving system, the robotic driving system including a turntable defining a steering axis and mounted to a steering wheel of a vehicle including an automated steering system, a robot frame mounted to the vehicle and including a support member, a transmission device coupled to the support member and operatively coupled to the turntable, a steering motor in driving engagement with the transmission device, a load sensor mounted between the support member and the transmission device at a known distance from the steering axis, and a controller in communication with the steering motor and the load sensor, the controller configured to adjust a steering torque generated by the steering motor to compensate for any forces induced by said robotic driving system to prevent overriding the automated steering system.

20 Claims, 16 Drawing Sheets

(51) Int. Cl.
*B62D 5/04* (2006.01)
*B60W 30/12* (2020.01)
*B60W 30/18* (2012.01)

(52) U.S. Cl.
CPC . *B60W 30/18145* (2013.01); *B60W 30/18163* (2013.01); *B60W 2710/20* (2013.01)

(58) Field of Classification Search
CPC . B60W 2710/20; B62D 5/0463; B62D 1/286; B62D 1/00; G01M 17/007
See application file for complete search history.

(56) References Cited

U.S. PATENT DOCUMENTS

| | | | |
|---|---|---|---|
| 4,865,144 A | | 9/1989 | North |
| 5,821,718 A | * | 10/1998 | Shaffer .................... G05G 1/54 |
| | | | 318/587 |
| 5,835,867 A | * | 11/1998 | Froelich .................. B62D 1/00 |
| | | | 296/65.05 |
| 5,913,375 A | * | 6/1999 | Nishikawa ............ G01S 13/931 |
| | | | 701/28 |
| 5,991,674 A | * | 11/1999 | Froelich .................. B62D 1/00 |
| | | | 701/1 |
| 6,212,443 B1 | * | 4/2001 | Nagata .................. G05B 19/423 |
| | | | 700/63 |
| 6,622,584 B2 | * | 9/2003 | Staehle ................. B60T 17/223 |
| | | | 74/478 |
| 6,901,320 B2 | | 5/2005 | Yao et al. |
| 7,431,325 B2 | | 10/2008 | Stable |
| 7,628,239 B1 | | 12/2009 | Louie et al. |
| 8,447,509 B2 | | 5/2013 | Kelly et al. |
| 8,457,868 B2 | | 6/2013 | Tange et al. |
| 8,583,358 B2 | | 11/2013 | Kelly et al. |
| 8,589,062 B2 | | 11/2013 | Kelly et al. |
| 8,615,334 B2 | | 12/2013 | Ewert |
| 8,700,216 B2 | | 4/2014 | Best et al. |
| 8,751,143 B2 | | 6/2014 | Kelly et al. |
| 8,954,235 B2 | | 2/2015 | Lee et al. |
| 8,965,633 B2 | | 2/2015 | Lee et al. |
| 9,073,576 B2 | | 7/2015 | Lee et al. |
| 9,164,508 B1 | | 10/2015 | Takach, Jr. |
| 9,844,880 B1 | | 12/2017 | Takach |
| 9,996,081 B2 | | 6/2018 | Owens et al. |
| 10,183,697 B2 | | 1/2019 | Lee |
| 10,272,940 B2 | | 4/2019 | Staehle |
| 10,401,894 B2 | | 9/2019 | Staehle |
| 10,613,544 B2 | | 4/2020 | Guterman et al. |
| 11,280,704 B2 | | 3/2022 | Perrone et al. |
| 11,334,074 B2 | | 5/2022 | Guptha et al. |
| 2004/0069554 A1 | | 4/2004 | Staehle |
| 2008/0288142 A1 | | 11/2008 | Ewert |
| 2009/0056432 A1 | | 3/2009 | Steininger |
| 2011/0126642 A1 | | 6/2011 | Stahle |
| 2015/0149021 A1 | * | 5/2015 | Duncan ................. B60W 30/16 |
| | | | 701/23 |
| 2016/0280250 A1 | | 9/2016 | Stahle |
| 2016/0377508 A1 | | 12/2016 | Perrone et al. |
| 2018/0105200 A1 | | 4/2018 | Joughin |
| 2018/0181132 A1 | | 6/2018 | Kunihiro et al. |
| 2018/0201299 A1 | | 7/2018 | Ashtari |
| 2019/0041847 A1 | * | 2/2019 | Silberling ............ B62D 15/025 |
| 2020/0001889 A1 | * | 1/2020 | Niu ....................... B60W 10/20 |
| 2020/0010061 A1 | | 1/2020 | Tiwari et al. |
| 2020/0041385 A1 | | 2/2020 | Perrone et al. |
| 2021/0188239 A1 | | 6/2021 | Gugler et al. |
| 2021/0318711 A1 | | 10/2021 | Camacho et al. |
| 2021/0403084 A1 | | 12/2021 | Hubbard et al. |

FOREIGN PATENT DOCUMENTS

| | | |
|---|---|---|
| CN | 104401391 B | 5/2016 |
| CN | 106840705 A | 6/2017 |
| CN | 108032305 A | 5/2018 |
| CN | 209505463 U | 10/2019 |
| CN | 214471766 U | 10/2021 |
| DE | 10 2021 111 037 A1 | 7/2022 |
| DE | 102021111037 A1 | 7/2022 |
| EP | 1862374 B1 | 6/2009 |
| EP | 2 305 526 A1 | 4/2011 |
| EP | 2305526 A1 | 4/2011 |
| EP | 2 522 976 A1 | 11/2012 |
| EP | 2522976 A1 | 11/2012 |
| EP | 2 511 152 B1 | 11/2013 |
| EP | 2454145 B1 | 11/2013 |
| EP | 2511152 B1 | 11/2013 |
| EP | 3 244 185 A1 | 11/2017 |
| EP | 3244185 A1 | 11/2017 |
| EP | 3 244 185 B1 | 12/2019 |
| EP | 3244185 B1 | 12/2019 |
| EP | 3661825 B1 | 1/2022 |
| GB | 2592562 A | 9/2021 |
| JP | 3623721 B2 | 2/2005 |
| JP | 5245905 B | 7/2013 |
| JP | 5245905 B2 | 7/2013 |
| SE | 540126 C2 | 4/2018 |
| WO | 2011007114 A1 | 1/2011 |
| WO | 2015064873 A1 | 5/2015 |
| WO | WO 2015/064873 A1 | 5/2015 |

OTHER PUBLICATIONS

AB Dynamics Ltd., "LaunchPad Webpage", https://www.abdynamics.com/de/products/track-testing/adas-targets/launch-pad, 2020, 2 pages.
English language abstract for CN 103935395 B extracted from espacenet.com database on Feb. 3, 2021, 1 page.
English language abstract for CN 104401391 B extracted from espacenet.com database on Feb. 3, 2021, 1 page.
English language abstract for EP 2 305 526 A1 extracted from espacenet.com database on Feb. 3, 2021, 1 page.
English language abstract for EP 2 522 976 A1 extracted from espacenet.com database on Feb. 3, 2021, 1 page.
English language abstract for EP 2 511 152 B1 extracted from espacenet.com database on Feb. 3, 2021, 1 page.
English language abstract for JP 3623721 B2 extracted from espacenet.com database on Feb. 3, 2021, 1 page.
English language abstract for JP 5245905 B extracted from espacenet.com database on Feb. 3, 2021, 1 page.
English language abstract for WO 2015/064873 A1 extracted from espacenet.com database on Feb. 3, 2021, 2 pages.
European Search Report for Application EP 20 21 5418 dated May 14, 2021, 2 pages.
English language abstract for CN 204269382 U extracted from espacenet.com database on May 30, 2023, 1 page.
English language abstract for CN 106840705 A extracted from espacenet.com database on May 30, 2023, 1 page.
English language abstract for CN 108032305 A extracted from espacenet.com database on May 30, 2023, 1 page.
English language abstract for CN 209505463 U extracted from espacenet.com database on May 30, 2023, 1 page.
English language abstract for CN 214471766 U extracted from espacenet.com database on May 30, 2023, 1 page.
Machine-Assisted English language abstract for DE 10 2021 111 037 A1 extracted from espacenet.com database on May 30, 2023, 2 pages.
English language abstract for EP 3 244 185 A1 extracted from espacenet.com database on May 30, 2023, 2 pages.
English language abstract for EP 3 244 185 B1 extracted from espacenet.com database on May 30, 2023, 2 pages.
Stahle Robot Systems, "Automated Driving System SFPHybrid For Cars Webpage", https://www.staehle-robots.com/english-1/products/sfphybrid-eng/, 2020, 2 pages.
Stahle Robot Systems, "Product News Webpage", https://www.staehle-robots.com/english-1/news/product-hews/, 2020, 4 pages.

\* cited by examiner

SYSTEM AND METHOD FOR FORCE COMPENSATION IN A ROBOTIC DRIVING SYSTEM

CROSS-REFERENCE TO RELATED APPLICATIONS

This application claims priority to U.S. Provisional Patent Application Ser. No. 62/951,153, filed Dec. 20, 2019, the disclosure of which is hereby incorporated by reference in its entirety.

TECHNICAL FIELD

The present disclosure is generally directed to a robotic driving system and method of compensating for any forces induced by components of the robotic driving system.

BACKGROUND

Automated Driving Systems have become increasingly prevalent equipment on modern automobiles. Accordingly, there is a need to develop testing equipment that can cooperate with these complex systems in order to observe and evaluate their performance. Specifically pertaining to Automated Steering Systems (e.g., Lane Keep Assist Systems), there is difficulty in testing such systems without the Automated Steering System behaving as if it is being manually overridden by a driver (i.e., as if the driver was applying a torque the steering wheel to manually maneuver the vehicle). The present disclosure describes a system and method for preventing testing equipment from overriding of Automated Steering Systems by compensating for any forces induced by the componentry of the testing equipment in order to observe and evaluate the performance of Automated Steering Systems.

SUMMARY

The present disclosure is directed to a robotic driving system for rotating a steering wheel of a vehicle including an automated steering system. The robotic driving system includes a turntable defining a steering axis and configured to be mounted to the steering wheel of the vehicle such that the turntable and the steering wheel rotate concurrently about the steering axis. The robotic driving system also includes a robot frame including a support member and configured to be mounted to the vehicle. The robotic driving system further includes a transmission device coupled to the support member and operatively coupled to the turntable to transmit a steering torque to the turntable for rotating the turntable and the steering wheel. The robotic driving system also further includes a steering motor in driving engagement with the transmission device to generate and apply the steering torque to the transmission device. Additionally, the robotic driving system includes a load sensor mounted between the support member and the transmission device at a known distance from the steering axis with the load sensor generating a load signal corresponding to a force experienced between the transmission device and the support member. Furthermore, the robotic driving system includes a controller in communication with the steering motor and the load sensor with the controller calculating a resistive torque experienced by the turntable based on the load signal and the known distance from the steering axis, and the controller is capable of determining a compensatory torque to be applied to the steering torque based on the resistive torque to compensate for any forces induced by the robotic driving system for preventing an override of the automated steering system.

The present disclosure also includes a method of operating the robotic driving system to prevent an override of the automated steering system. The method of operating the robotic driving system includes a step of generating the steering torque using the steering motor. The method of operating the robotic driving system also includes a step of applying the steering torque to the transmission device. The method of operating the robotic driving system further includes a step of generating the load signal corresponding to the force experienced between the transmission device and the support member. The method of operating the robotic driving system also further includes a step of calculating the resistive torque experienced by the steering wheel based on the load signal and the known distance from the steering axis using the controller. Additionally, the method of operating the robotic driving system includes a step of determining the compensatory torque based on the resistive torque using the controller. Furthermore, the method of operating the robotic driving system includes a step of adjusting the steering torque generated by the steering motor based on the compensatory torque to compensate for any forces induced by the robotic driving system for preventing an override of the automated steering system.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION

Figure 1:
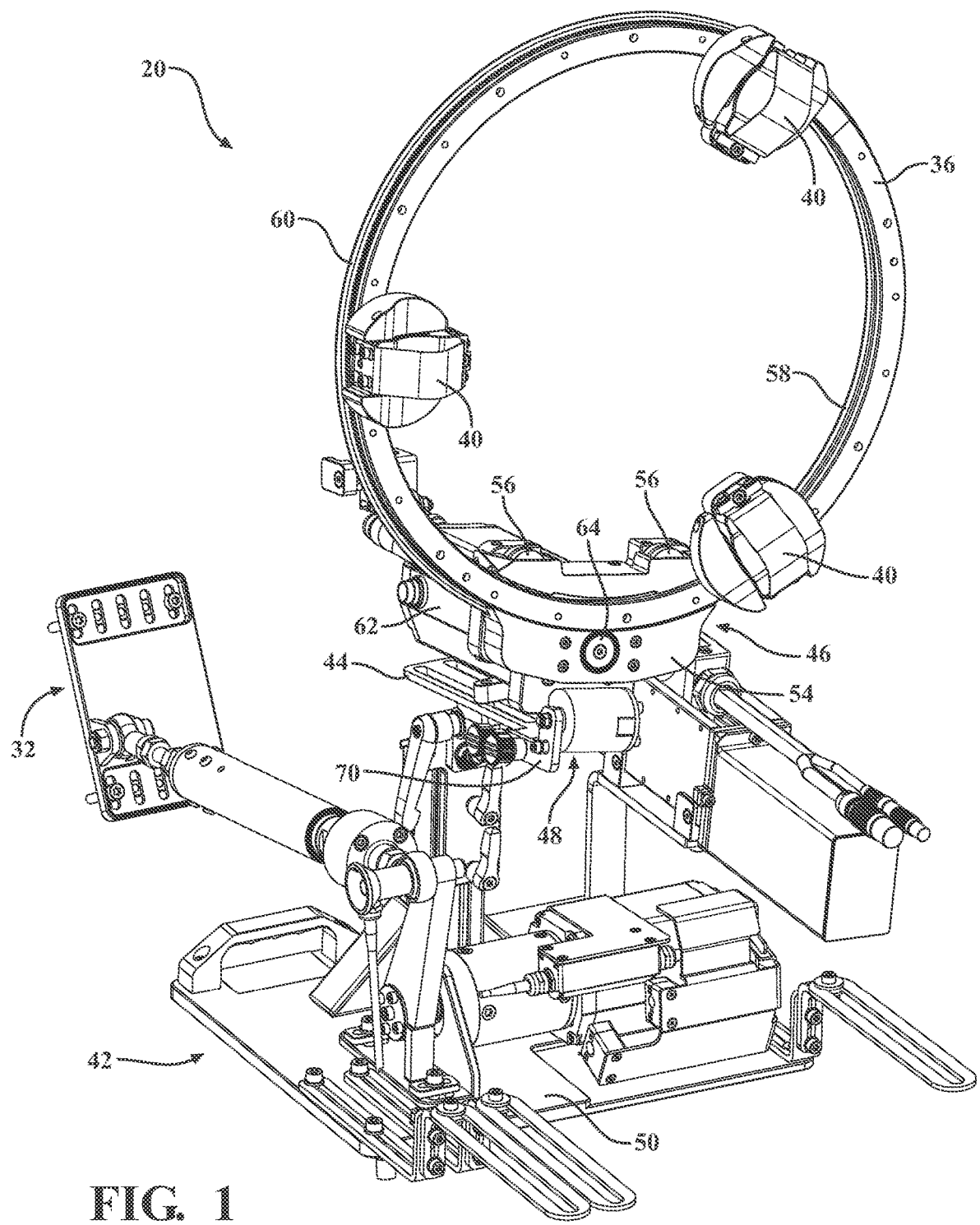
FIG. 1 is a perspective view of a robotic driving system.

With reference to the Figures, wherein like numerals indicate like parts throughout the several views, FIGS. 1-16 generally show a robotic driving system 20 for testing a vehicle 22 including an automated steering system 24. The robotic driving system 20 is capable of rotating a steering wheel 26 of the vehicle 22. The robotic driving system 20 may also include an accelerator actuator 28 configured to be coupled to and actuate an accelerator pedal 30 of the vehicle 22. The robotic driving system 20 may further include a brake actuator 32 configured to be coupled to and actuate a brake pedal 34 of the vehicle 22. The robotic driving system 20 is capable of driving the vehicle 22 with the same functionality as a human. For instance, the robotic driving system 20 may be capable of performing coordinated actuation of the steering wheel 26, accelerator pedal 30, and brake pedal 34 of the vehicle 22 to perform typical tasks associated with driving. Such tasks include actuating the steering wheel 26 to direct the vehicle 22 into a parking spot, navigate the vehicle 22 around a corner, change the lane of the vehicle 22, etc. Importantly, there is a need to effectively observe and evaluate the performance of automated steering systems 24.

The automated steering system 24, for example, may be a Lane Keep Assist System (LKAS). It is contemplated, however, that as autonomous driving technology progresses, the automated steering system 24 may be a fully autonomous steering system. For safety purposes, automated steering systems 24 typically allow a driver to manually "override" the automated steering system 24 by applying a manual torque to the steering wheel 26 to indicate the driver's desired direction of the vehicle 22. This functionality presents a challenge for using current robotic testing equipment to observe and evaluate the performance of automated steering systems 24. Particularly, automated steering systems 24 may unintentionally perceive any forces induced by components of current robotic testing equipment as a driver manually overriding the automated steering system 24. Due to this phenomenon, the ability to effectively observe and evaluate the performance of automated steering systems 24 is reduced. Therefore, the robotic driving system 20 and method of compensating for any forces induced by components of the robotic driving system 20 of the present disclosure is needed to address the problem of unintentional overriding of automated steering systems 24. In order to manipulate the vehicle as little as possible, it is desirable that any forces induced by components of the robotic driving system 20 be compensated within the robotic driving system 20.

Figure 2:
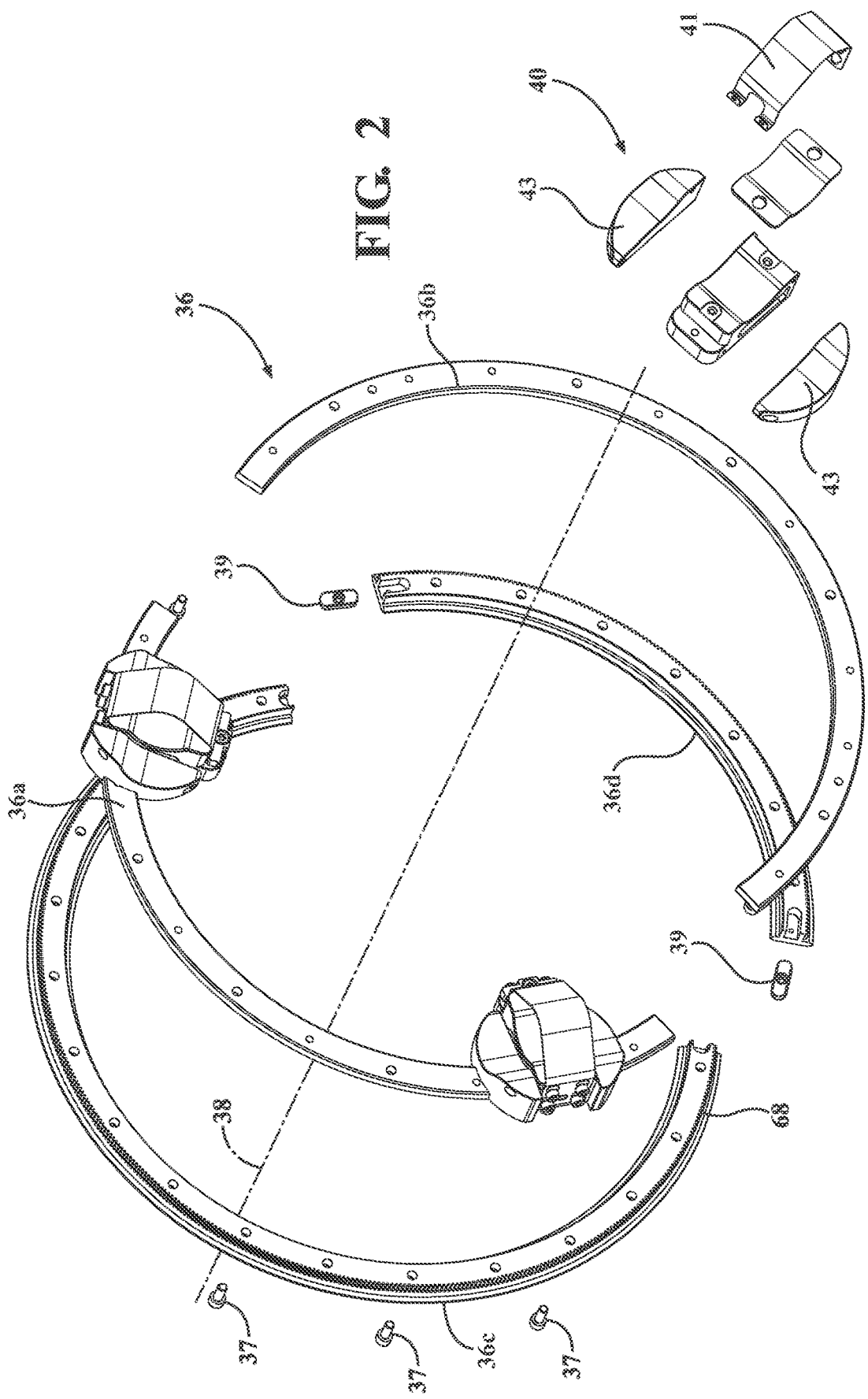
FIG. 2 is an exploded view of a turntable of the robotic driving system.

Referring to FIGS. 1-7, the robotic driving system 20 includes a turntable 36 defining a steering axis 38 and configured to be mounted to the steering wheel 26 of the vehicle 22 such that the turntable 36 and the steering wheel 26 rotate concurrently about the steering axis 38. In a preferred embodiment, such as shown in FIGS. 1 and 2, the turntable 36 may include separate portions assembled together with fasteners 37. For example, the turntable 36 may include a first upper portion 36a, a second upper portion 36b, a first lower portion 36c, and a second lower portion 36d. The first and second upper portions 36a, 36b, may be assembled to the first and second lower portions 36c, 36d, using the fasteners 37 to form the turntable 36. Advantageously, constructing the turntable 36 from separate portions 36a, 36b, 36c, 36d allows the turntable 36 to be mounted behind the steering wheel 26 without removing the steering wheel 26. For example, the first upper portion 36a and the first lower portion 36c may be shaped such that they may be positioned around a steering column of the vehicle 22 and behind the steering wheel 26 without removing the steering wheel 26. Subsequently, the second upper portion 36b and the second lower portion 36d may be assembled to the first upper portion 36a and the first lower portion 36c using fasteners 37 to form the turntable 36. In some embodiments, the first upper portion 36a may be permanently coupled to the first lower portion 36c, and/or the second upper portion 36b may be permanently coupled to the second lower portion 36d. Conversely, in other embodiments, portions 36a, 36b, 36c, 36d, may be completely separable from each other. Additionally, a key 39 may be disposed between the portions 36a, 36b, 36c, 36d to facilitate alignment of the portions 36a, 36b, 36c, 36d, such as shown in FIG. 2. Also, in an ideal embodiment, such as shown in FIG. 2, the second upper portion 36b may define a longer arc length than the second lower portion 36d such that the second upper portion 36b may be fastened to both the first lower portion 36c and the second lower portion 36d.

The turntable 36 may be mounted to the steering wheel using one or more braces 40. In the preferred embedment, such as shown in FIG. 2 and FIGS. 4-7, the braces 40 include a brace member 41 (shown in FIG. 2) constructed from stainless steel or any other suitable material, and configured to straddle the steering wheel 26 and be secured in place with a fastener, for example, to mount the turntable 36 to the steering wheel 26. However, other means of mounting the turntable 36 to the steering wheel in a secure and releasable manner are contemplated, such as, but not limited to, clamps, clasps, fasteners, or straps. Additionally, the braces 40 may be adjustable such that the turntable 36 may be mounted to differently sized/shaped steering wheels 26. For example, the braces 40 may include an adjustment for mounting the turntable 36 to steering wheels 26 having different radii. Also, the braces 40 may also include an adjustment for mounting the turntable 36 to steering wheels 26 having different thicknesses. Further, the braces 40 may by assembled to various locations on the turntable 36 such that the braces 40 are not aligned with spokes of the steering wheel 26. Also further, the braces 40 may include covers 43 (shown in FIG. 2) arranged about the braces 40 to cover any shape edges for driver comfort.

Figure 3:
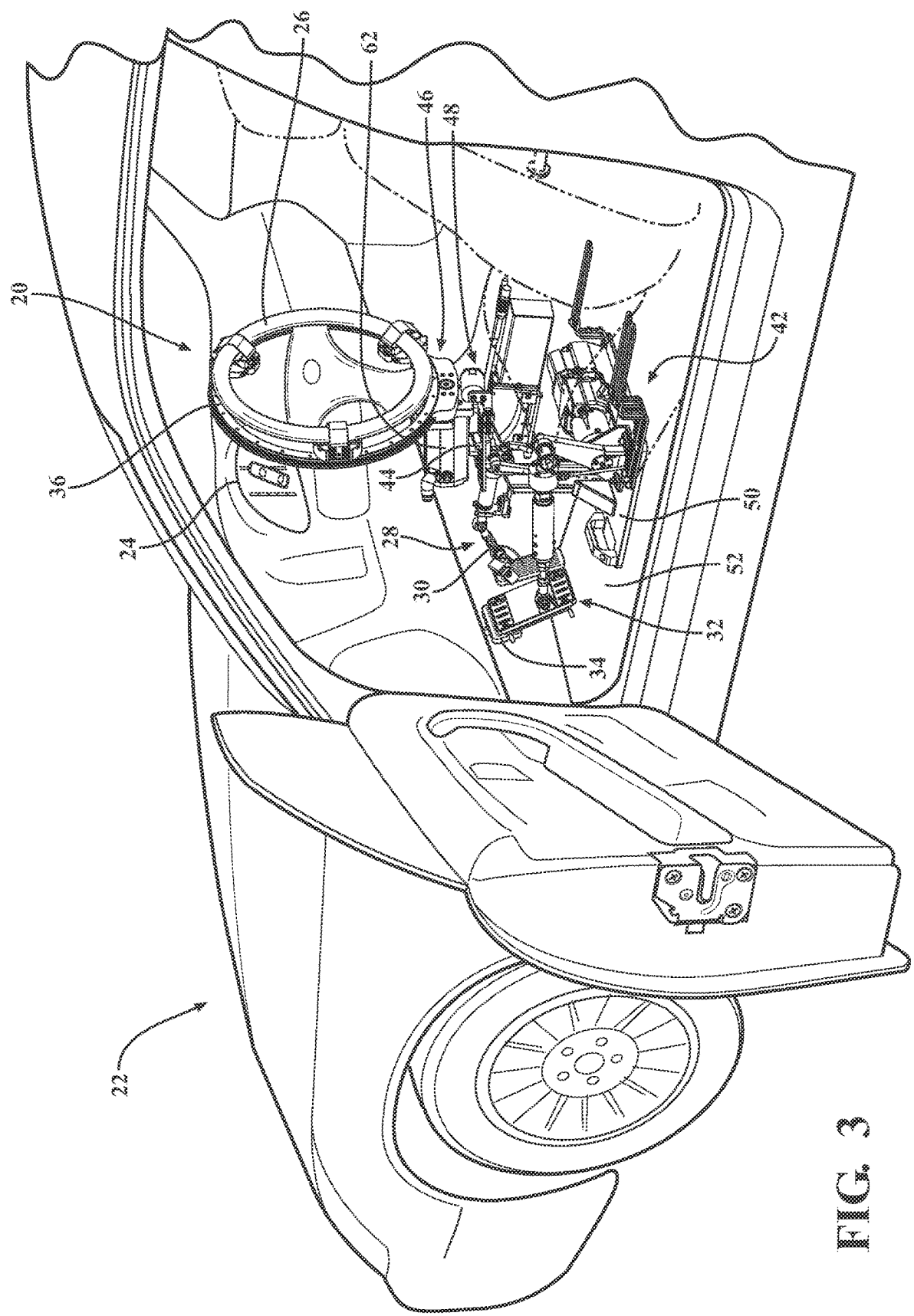
FIG. 3 is a perspective view of the robotic driving system installed in a vehicle.
Figure 4:
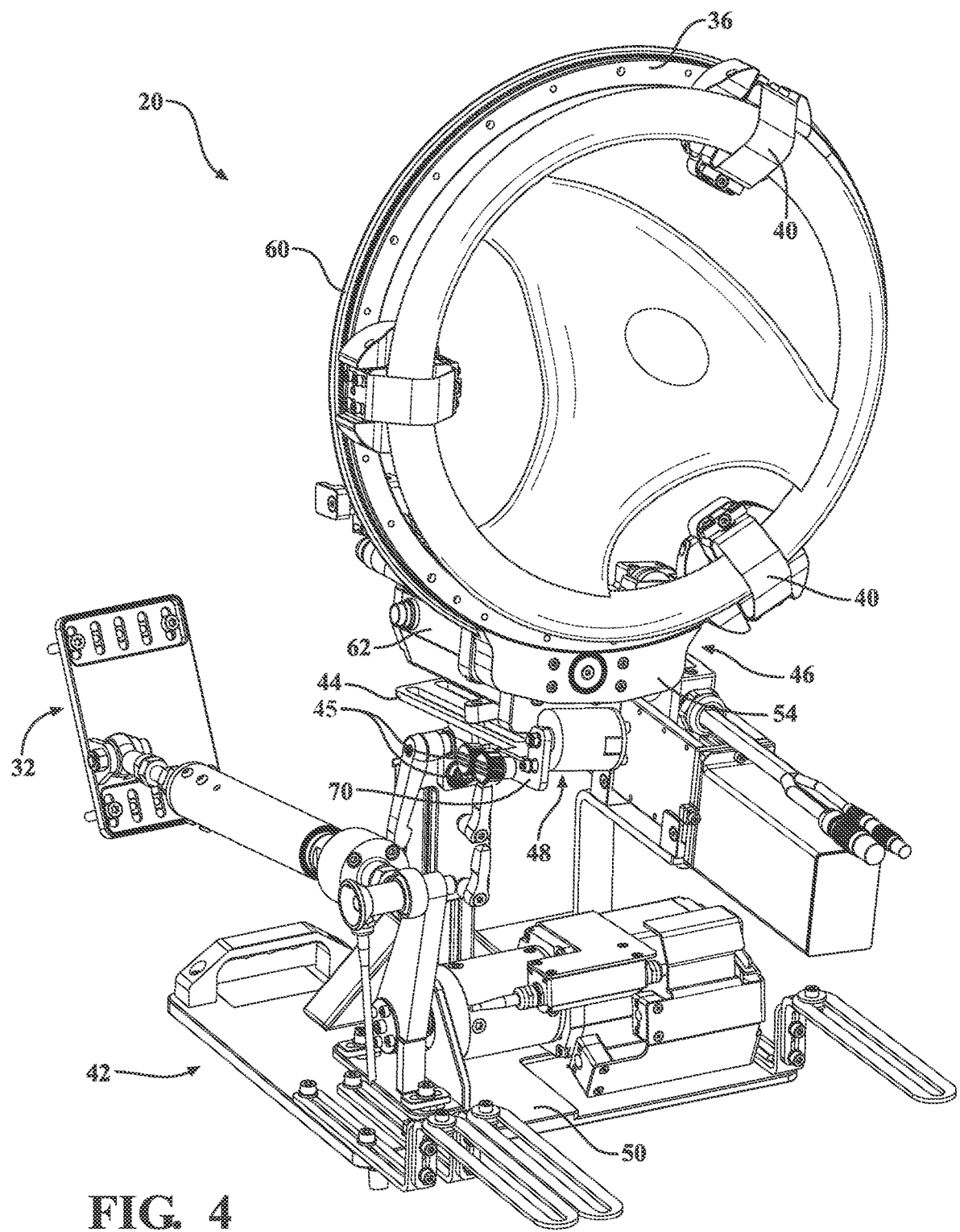
FIG. 4 is a perspective view of the robotic driving system mounted to a steering wheel of the vehicle.
Figure 5:
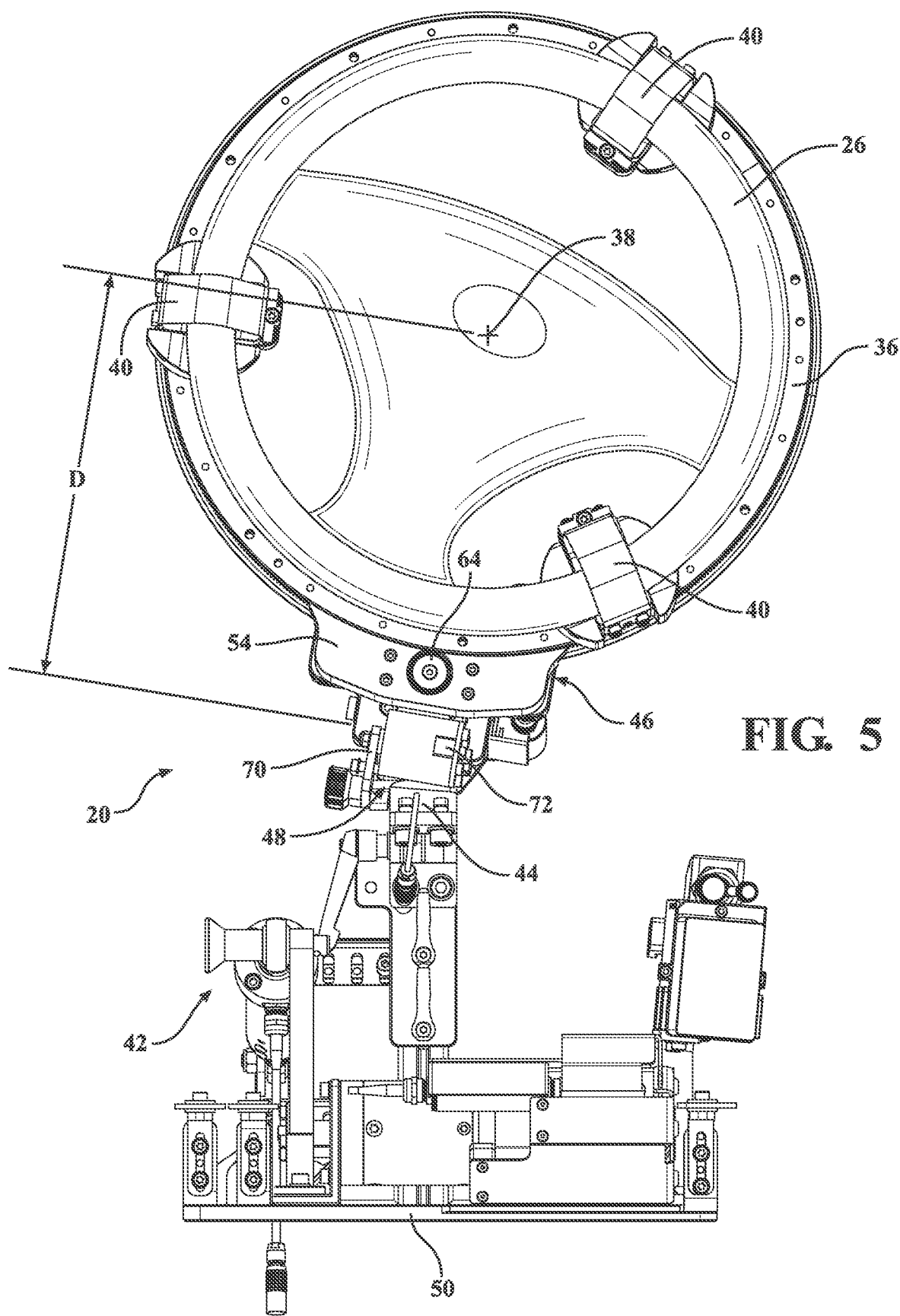
FIG. 5 is a front view of the robotic driving system mounted to the steering wheel of the vehicle.
Figure 6:
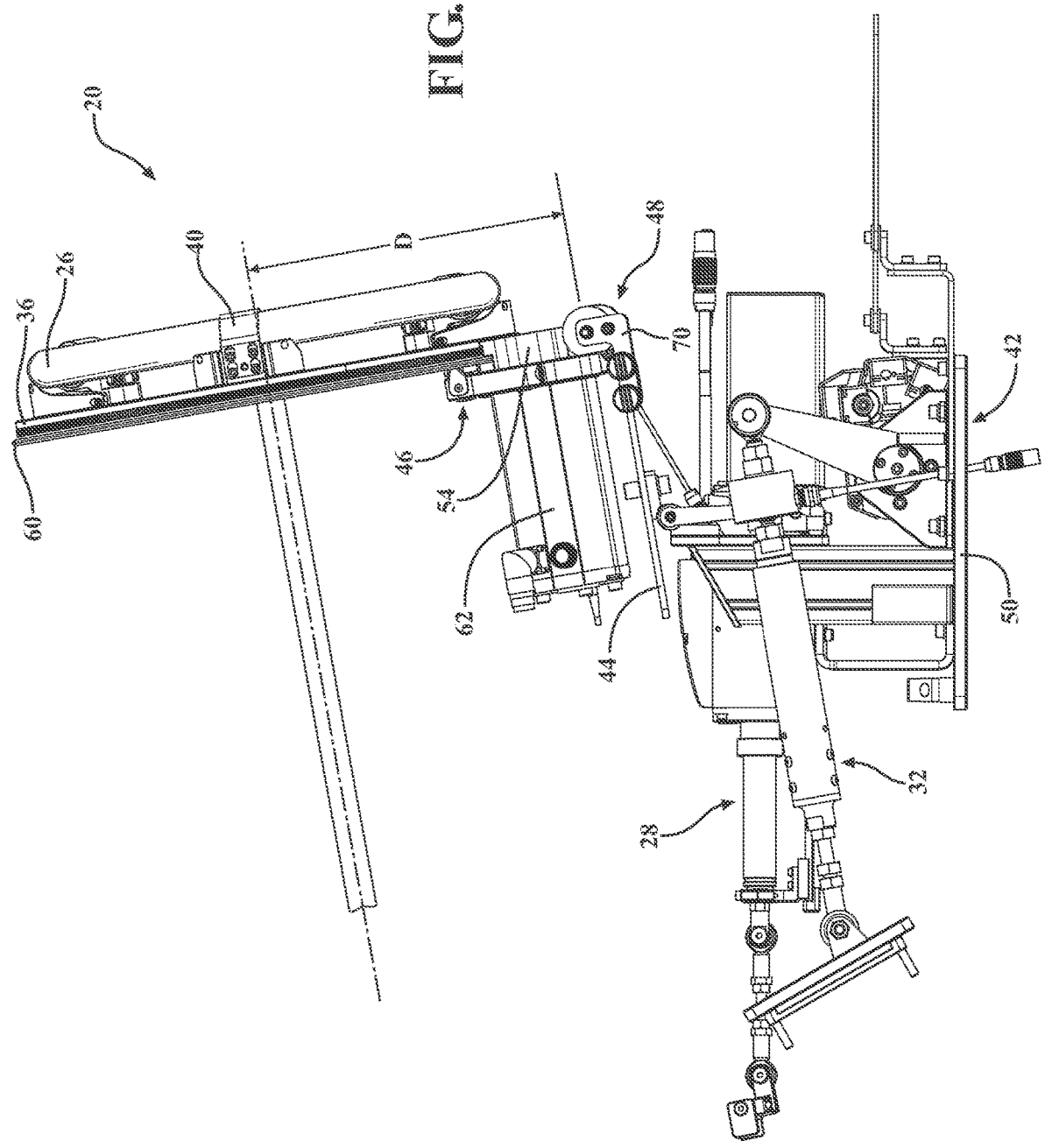
FIG. 6 is a side view of the robotic driving system mounted to the steering wheel of the vehicle.
Figure 7:
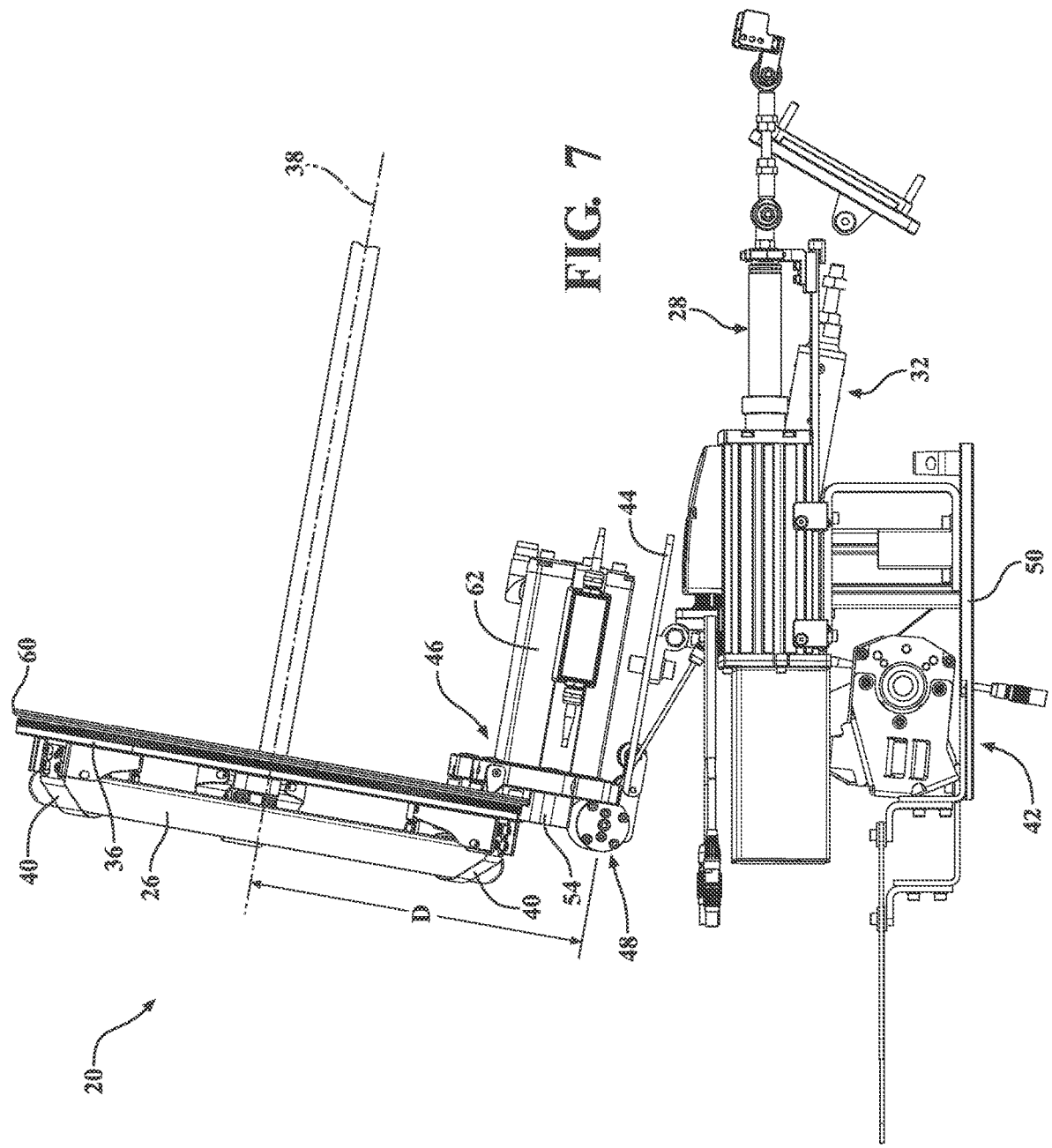
FIG. 7 is an opposite side view of the robotic driving system mounted to the steering wheel of the vehicle.

With continued reference to FIGS. 1-7, the robotic driving system 20 also includes a robot frame 42 that is configured to be mounted to the vehicle 22. The robot frame 42 includes a support member 44 for supporting a transmission device 46 and a load sensor 48 (described in further detail below). Referring to FIG. 3, the robot frame 42 may also include a base 50 configured to be mounted to a floor 52 of the vehicle 22. Alternatively, the base 50 may be configured to be mounted elsewhere on the interior of the vehicle 22 (not shown). For example, the base 50 may be mounted to a dashboard, windshield, seat, or center console of the vehicle 22. The support member 44 may extend upwardly from the base 50 toward the transmission device 46 to support the transmission device 46 and/or the load sensor 48 (described in further detail below). Additionally, the accelerator actuator 28 and brake actuator 32 may be mounted to the robot frame 42.

The transmission device 46 (shown throughout the figures) is coupled to the support member 44 such that the support member 44 provides support to the transmission device 46. More specifically, the transmission device 46 may include a transmission housing 54 mounted to the load sensor 48, and the load sensor 48 may be disposed between the support member 44 and the transmission device 46 (described in further detail below). Referring to FIGS. 8-11, which illustrates the transmission device 46 with the transmission housing 54 partially hidden, the transmission device 46 may include a plurality of bearing members 56 arranged to rotatably support the turntable 36 for rotation about the steering axis 38. Particularly, referring to FIG. 10 and FIG. 11, the bearing members 56 may be arranged to accommodate an inner lip 58 and an outer lip 60 of the turntable 36 such that the inner lip 58 and outer lip 60 roll on the bearing members 56 and constrain the turntable 36 to rotational movement about the steering axis 38. In the preferred embodiment, the first lower portion 36c and the second lower portion 36d of the turntable 36 may define the inner lip 58 and the outer lip 60.

Figure 8:
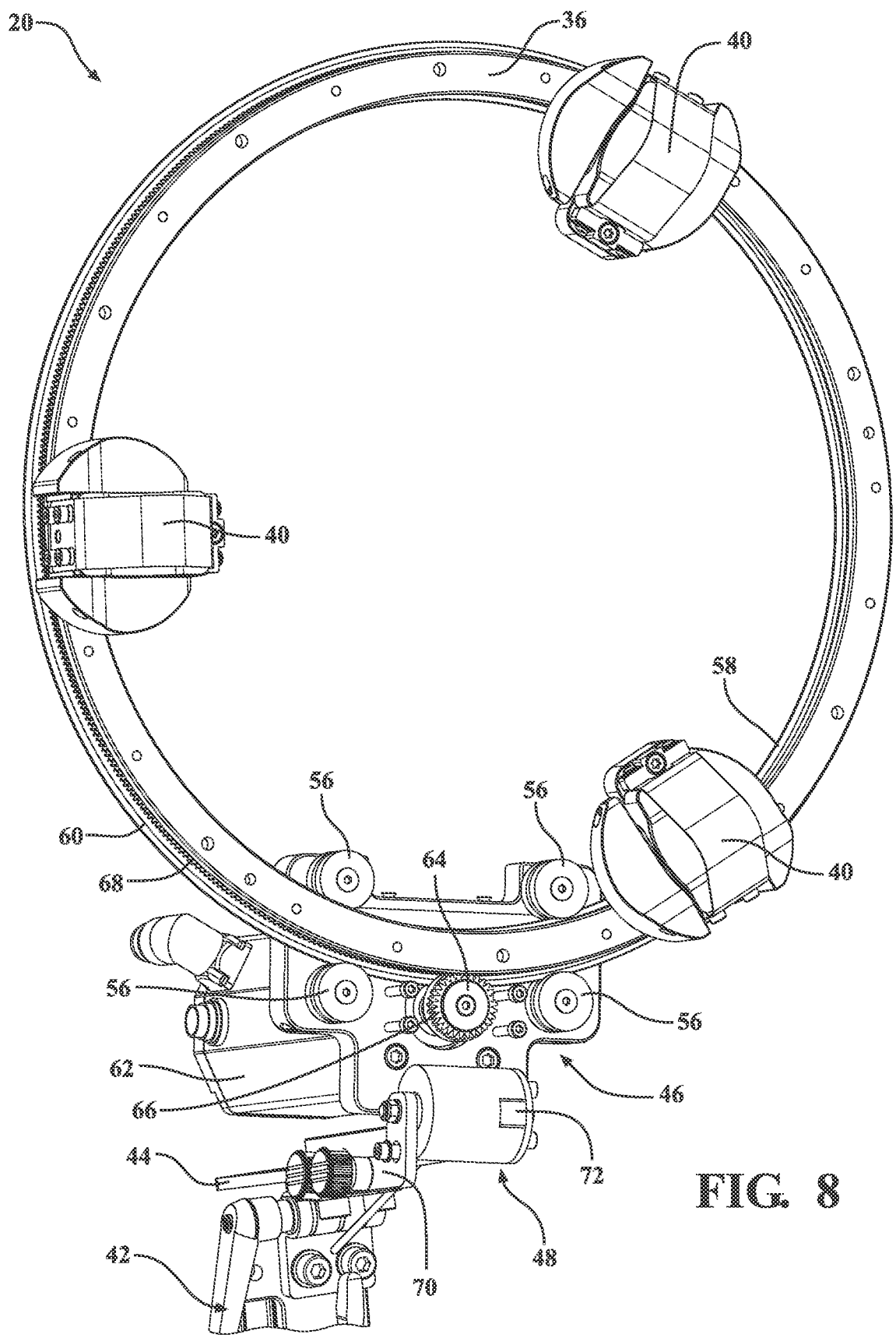
FIG. 8 is a fragmented front perspective view of the robotic driving system.
Figure 9:
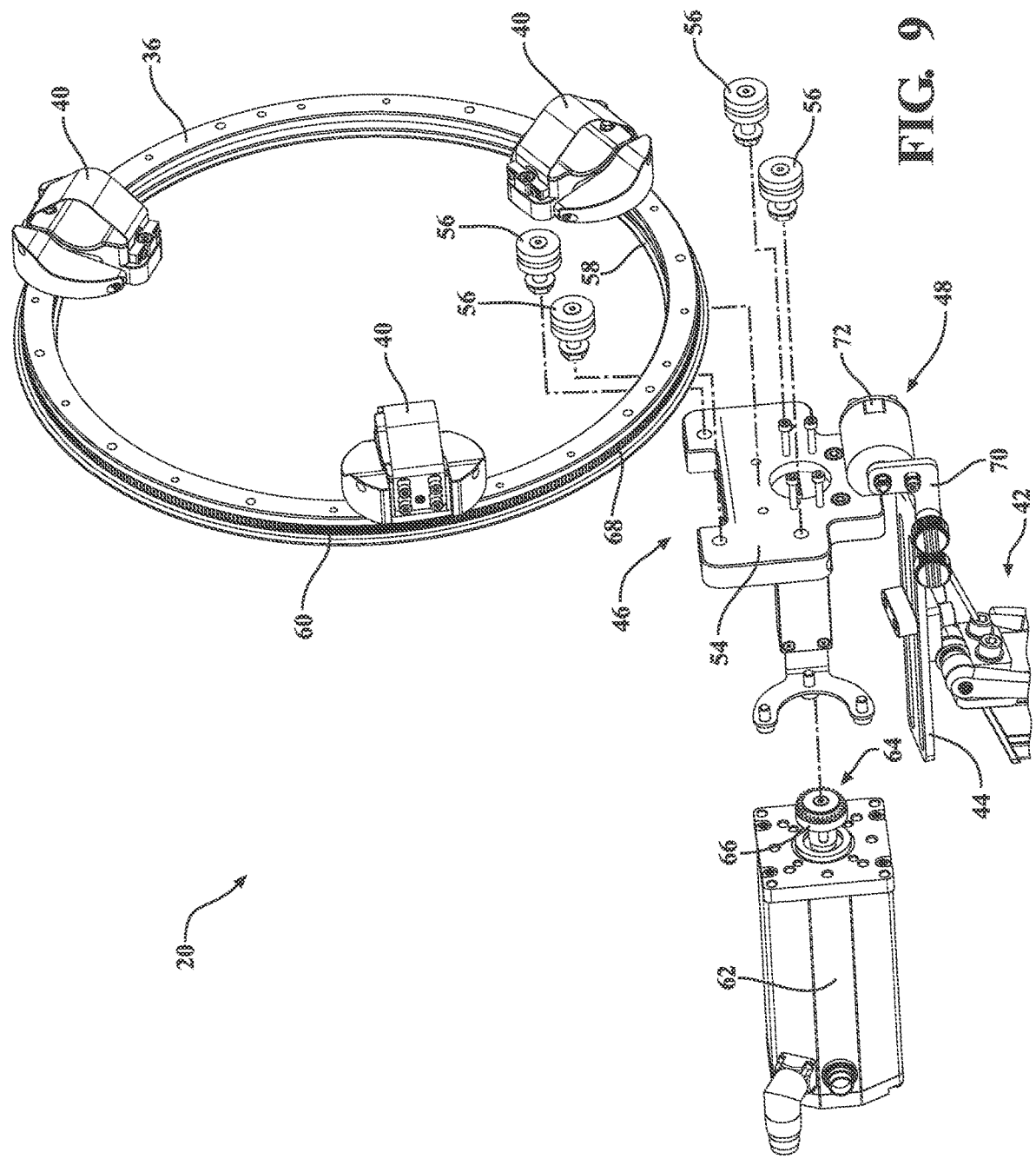
FIG. 9 is an exploded perspective view of the robotic driving system.
Figure 10:
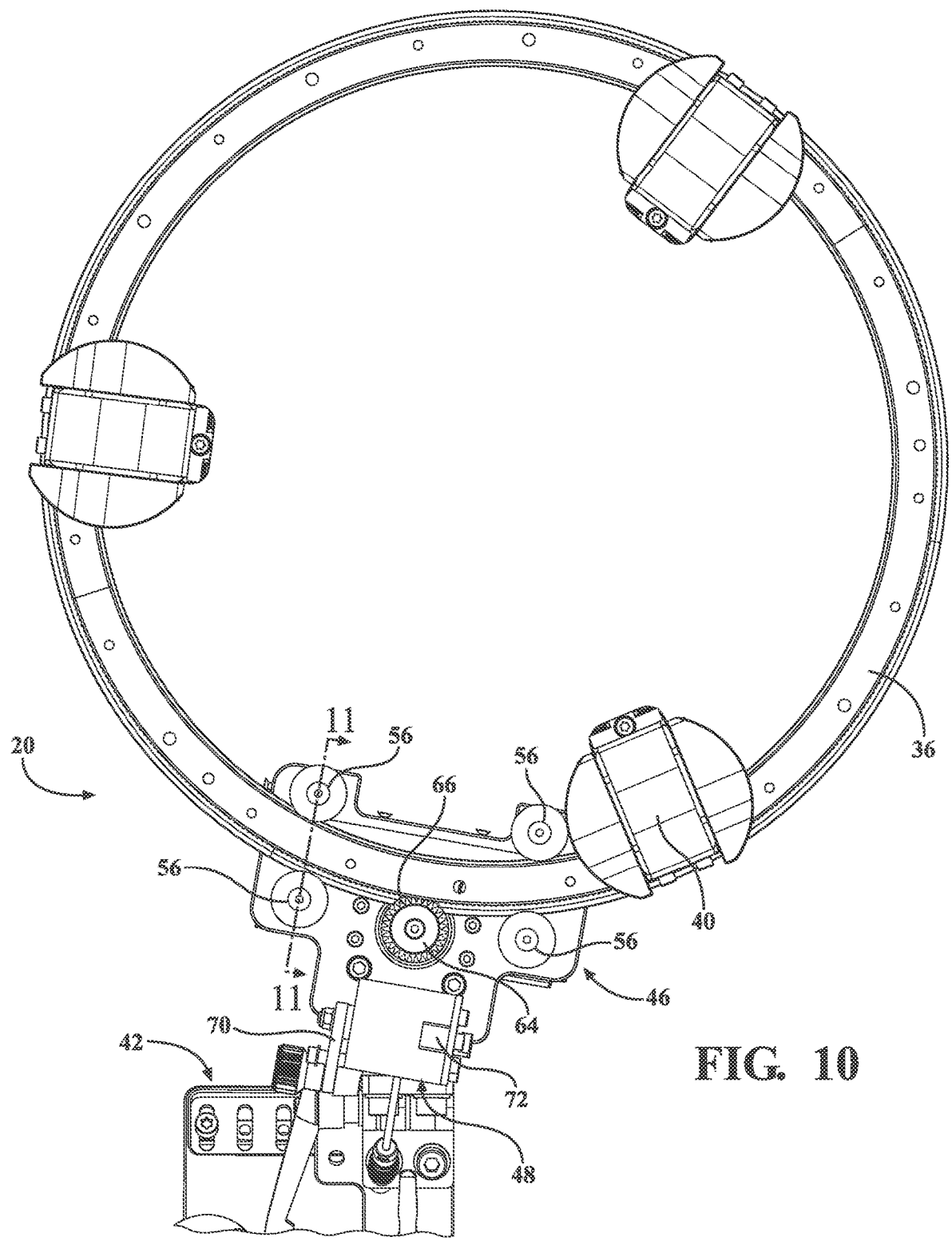
FIG. 10 is another fragmented front perspective view of the robotic driving system.
Figure 11:
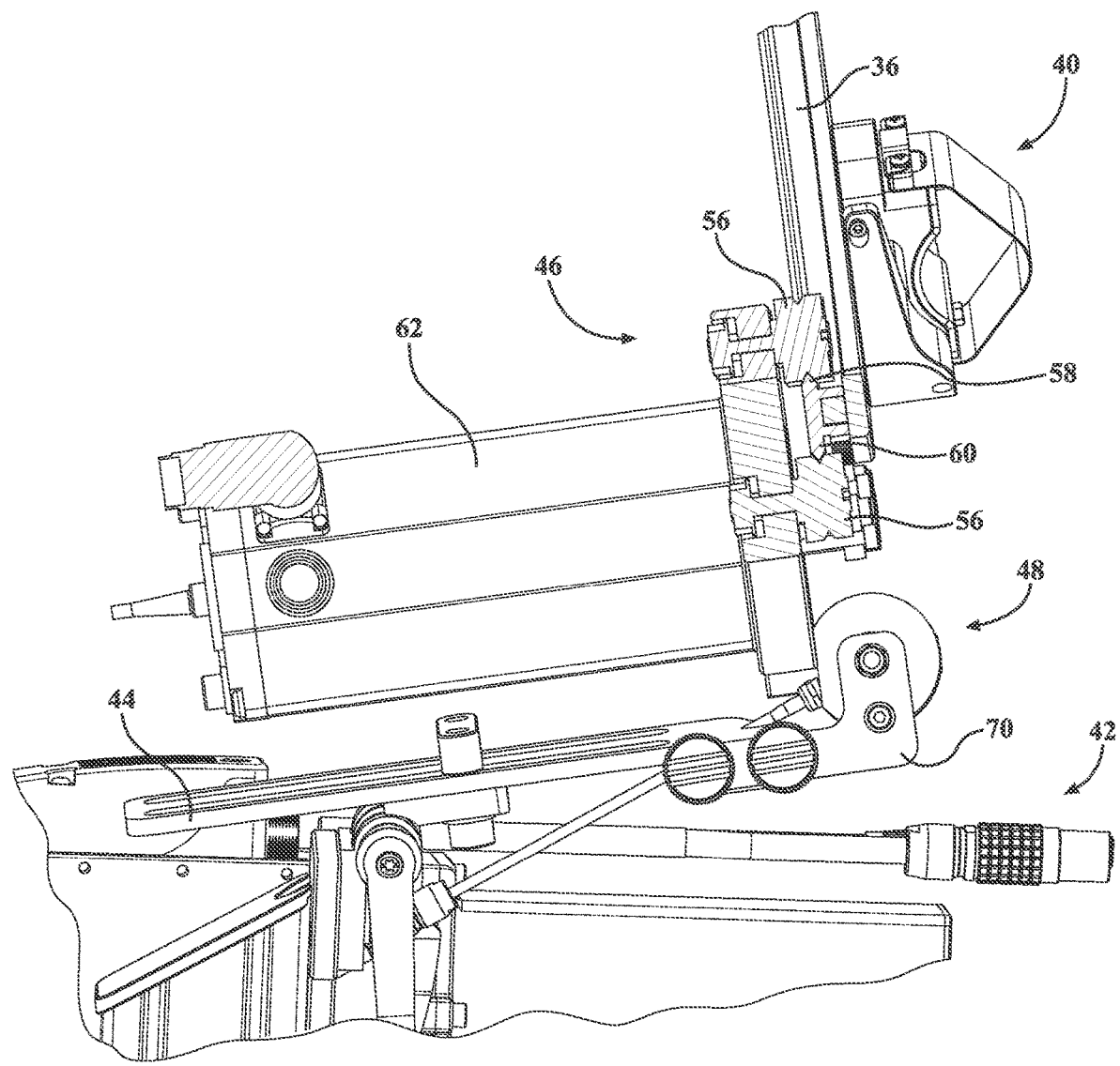
FIG. 11 is a fragmented section view of the driving robot of FIG. 10.
Figure 12:
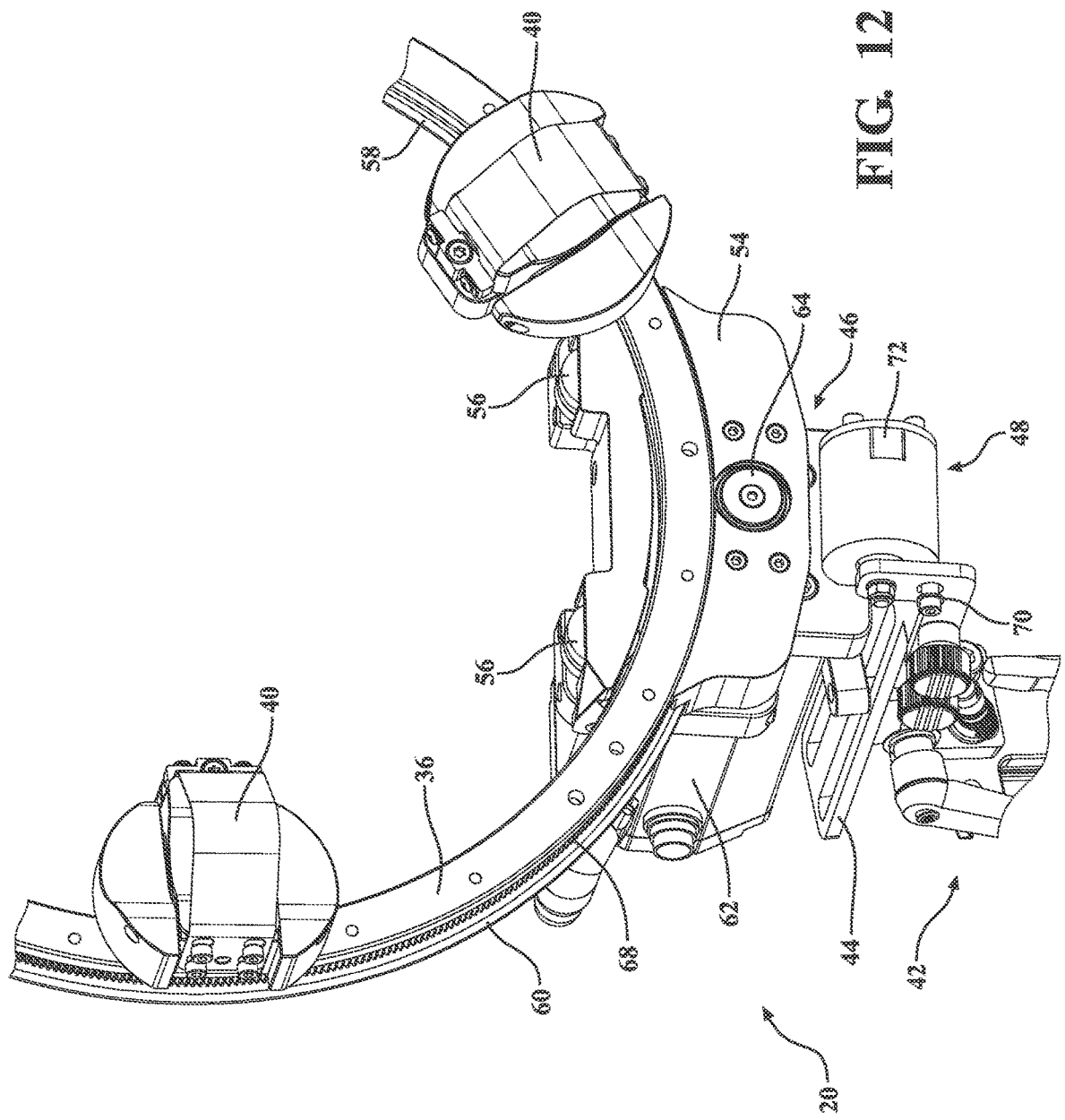
FIG. 12 is yet another fragmented front perspective view of the robotic driving system.

The robotic driving system 20 further includes a steering motor 62 capable of generating a steering torque ST. The steering motor 62 is in driving engagement with the transmission device 46 to generate and apply the steering torque ST to the transmission device 46. The steering motor 62 may be mounted to the transmission housing 54. For example, referring to FIG. 15, in some configurations, the steering motor 62 may be solely supported by the transmission housing 54. The transmission device 46 is also operatively coupled to the turntable 36 to transmit the steering torque ST to the turntable 36 for rotating the turntable 36 and the steering wheel 26 of the vehicle 22. For example, referring to FIGS. 8-10, the transmission housing 54 may include a drive member 64 partially disposed within the transmission housing 54. The drive member 64 may be rotatably mounted to the turntable 36 and operatively coupled to the steering motor 62 to transmit the steering torque ST from the steering motor 62 to the turntable 36 for rotating the turntable 36 and the steering wheel 26. In FIGS. 8-10, the drive member 64 is directly mounted to the steering motor 62. However, it is contemplated that intermediate componentry may be included, such as, but not limited to, a reduction gearset, to operatively couple the drive member 64 to the steering motor 62.

To rotatably mount the driving member 64 to the turntable 36, the drive member 64 may include a first torque transfer interface 66 and the turntable 36 includes a second torque transfer interface 68. The first torque transfer interface 66 and the second torque transfer interface 68 may cooperate to transmit the steering torque ST generated by the steering motor 62 from the drive member 64 to the turntable 36 for rotating the turntable 36 and the steering wheel 26. It is contemplated that various types of torque transfer interfaces may be utilized to transmit the steering torque ST from the steering motor 62 to the turntable 36 to actuate the steering wheel 26, such as, but not limited to, teeth. In the preferred embodiment, as shown in FIG. 10 for example, the first and second lower portions 36c, 36d of the turntable may include the second torque transfer interface 68 in the form of teeth configured to mesh with the first torque transfer interface 66 of the drive member 64, which is also in the form of teeth.

Figure 13:
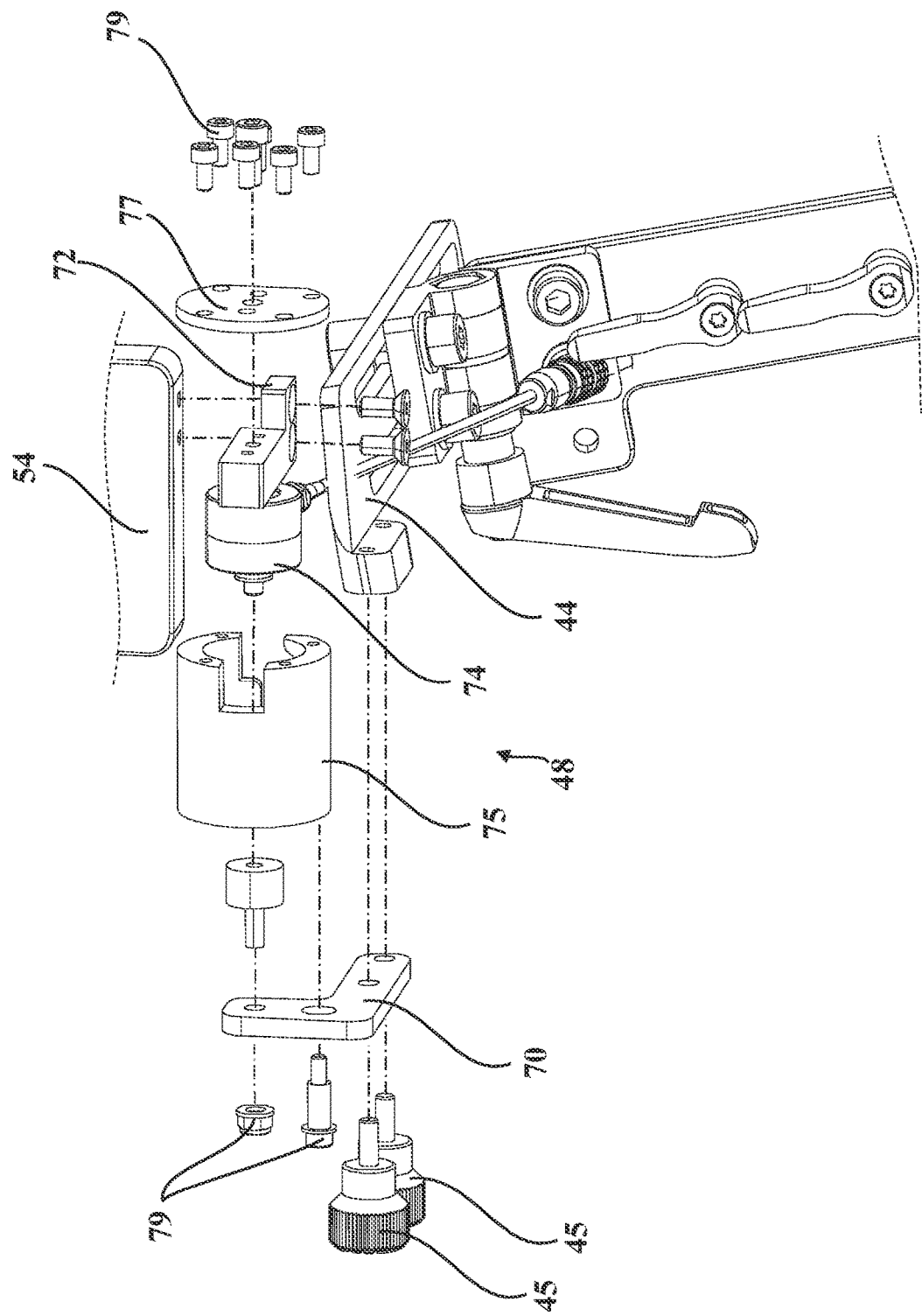
FIG. 13 is a fragmented exploded perspective view of the robotic driving system.
Figure 14:
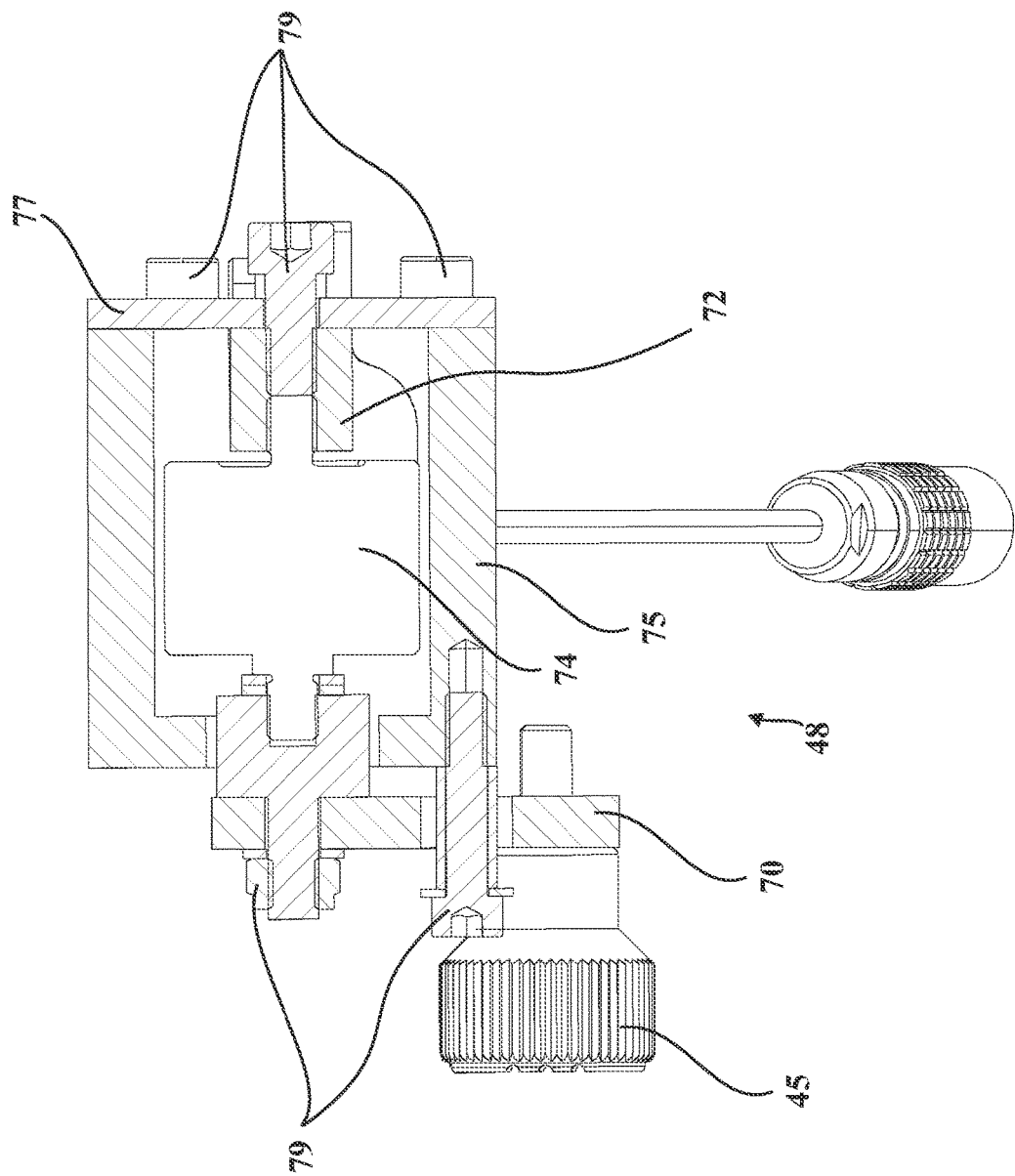
FIG. 14 is a fragmented sectional view of a load sensor of the robotic driving system.
Figure 15:
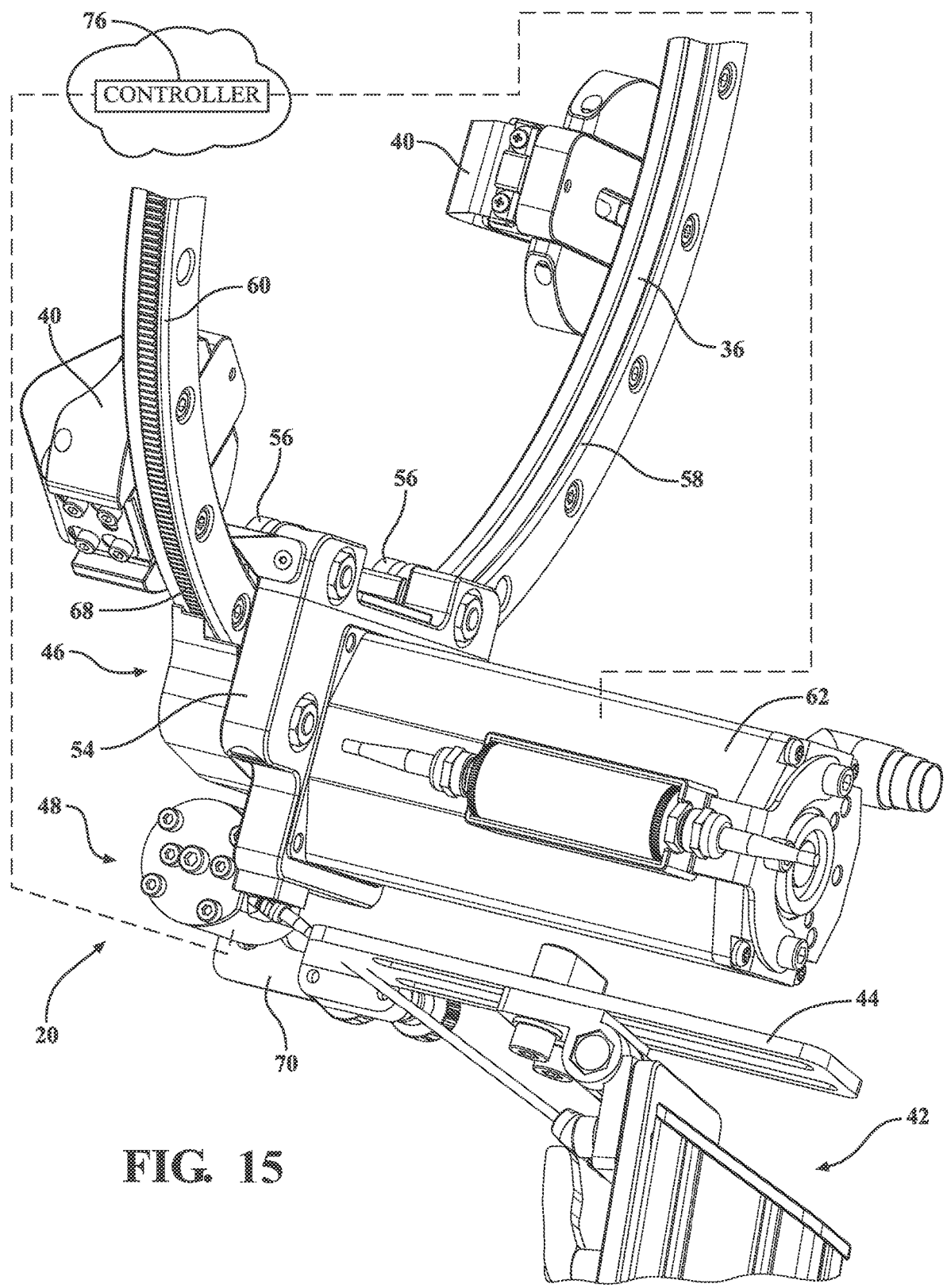
FIG. 15 is a fragmented rear perspective view of the robotic driving system.
Figure 16:
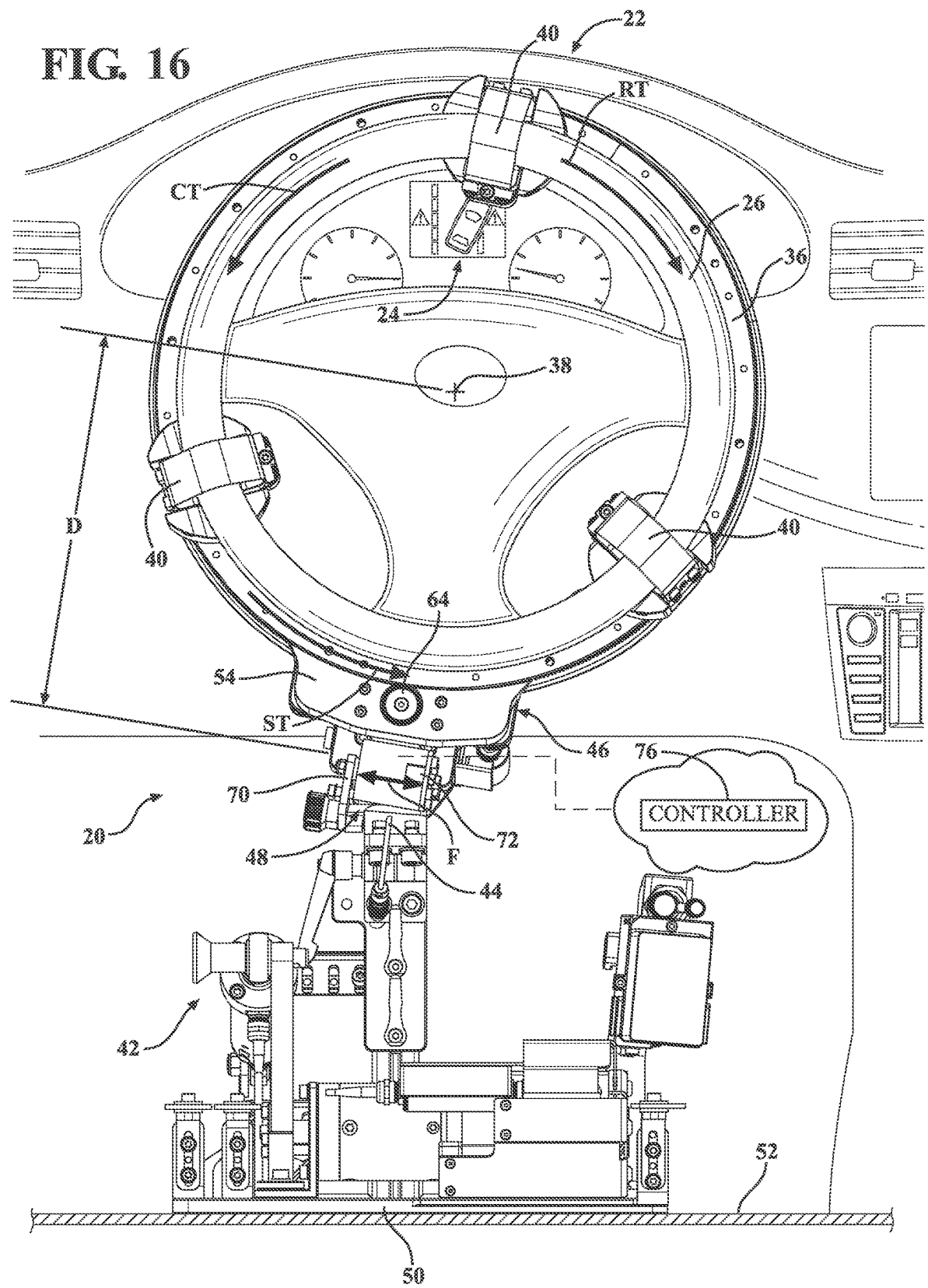
FIG. 16 is a front view of the robotic driving system mounted to the steering wheel of the vehicle illustrating a method of compensating for any forces induced by components of a robotic driving system.

Referring to FIGS. 5-16, the load sensor 48 is mounted between the support member 44 and the transmission device 46 at a known distance D from the steering axis 38 with the load sensor 48 generating a load signal corresponding to a force F (shown in FIG. 16) experienced between the transmission device 46 and the support member 44. It is desirable that the support member is rigid such that the support member has minimal deflection when experiencing the force F. Referring to FIGS. 13 and 14, the load sensor 48 may include a first portion 70 (best shown in FIGS. 12-14) mounted to the support member 44. The first portion 70 may, for example, be mounted to the support member 44 with hand fasteners 45 (shown in FIGS. 13 and 14) or any other suitable means. A second portion 72 (best shown in FIGS. 7, 13, and 14) may be mounted to the transmission housing 54 using fasteners or any other suitable means. It is contemplated that any suitable members may be used as the first portion 70 and the second portion 72, such as, but not limited to, brackets. Importantly, the first portion 70 and the second portion 72 are arranged to transmit the force F experience between the transmission device 46 and the support member 44 to a load cell 74 mounted between the first portion 70 and the second portion 72 to measure the force F experienced between the transmission device 46 and the support member 44 and to generate the load signal. The load cell 74 may be mounted to the first portion 70 and the second portion 72 using any suitable means, such as fasteners 79. Notably, as illustrated in FIGS. 13 and 14, the load cell 74 may be contained within a load sensor housing 75. The fasteners 79 may be arranged to limit rotation of the load cell 74 and the load sensor housing 75. The load sensor 48 may also include a load cell cover 77 mounted to the second portion 72 for sealing the load senor and accommodating fasteners 79. The load cell 74 may be any suitable device to measure compression or tension between the first portion 70 and the second portion 72, such as, but not limited to, strain gauge load cells, pneumatic load cells, hydraulic load cells, piezoelectric load cells, etc. Notably, the load sensor 46, robot frame 42, and support member 44 may be arranged offset from the steering axis such that a driver may comfortably fit their driving leg in the footwell of the vehicle.

The robotic driving system 20 further includes a controller 76 (shown schematically in FIGS. 15 and 16) in communication with the steering motor 62 and the load sensor 48. The controller 76 is configured to calculate a resistive torque RT experienced by the turntable 36 based on the load signal corresponding to the force F and the known distance D from the steering axis 38. The resistive torque RT is indicative of any forces induced by the robotic driving system 20 that may lead to an unintentional override of the automated steering system 24. Forces that may be induced by the robotic driving system 20 include friction of internal components and inertial resistance to rotation of the turntable 36. Additionally, based on the resistive torque RT, the controller 76 is also configured to determine a compensatory torque CT to be applied to the steering torque ST to compensate for any forces induced by the robotic driving system in order to prevent an override of the automated steering system 24. Advantageously, adjusting the steering torque ST based on the compensatory torque CT enables the robotic driving system 20 to internally compensate for any forces induced by its componentry (such as the steering motor 62, or the transmission device 46), and thus provides an integrated solution to prevent the overriding of the automated steering system that is problematic with current robotic testing equipment.

The present disclosure also includes a method of operating the robotic driving system 20 to prevent an override of the automated steering system 24. The method of operating the robotic driving system 20 includes a step of generating a steering torque ST using the steering motor 62. The steering torque ST may be generated as a result of the controller 76 transmitting a motor signal to the steering motor 62 to generate the steering torque ST in a particular direction and at a particular magnitude. The method of operating the robotic driving system 20 also includes a step of applying the steering torque ST to the transmission device 46. As mentioned above, the transmission device 46 is also operatively coupled to the turntable 36 to transmit the steering torque ST to the turntable 36 for rotating the turntable 36 and the steering wheel 26. Thus, applying the steering torque ST to the transmission device 46 will result in rotation of the steering wheel 26 to change the vehicle's 22 trajectory.

The method of operating the robotic driving system 20 further includes a step of generating a load signal using the load sensor 48 corresponding to a force F experienced between the transmission device 46 and the support member 44. For example, referring to FIG. 16, if the vehicle 22 is drifting out of a desired lane, as indicated by the automated steering system 24, the automated steering system 24 may urge the steering wheel 26 in the proper direction to correct of the vehicle's 22 the trajectory. However, the automated steering system 24 may unintentionally perceive any forces induced by the components of the robotic driving system 20 as a driver manually overriding the automated steering system 24. In this scenario, the driver is not applying a manual torque to the steering wheel 26. In fact, the automated steering system is experiencing a resistive torque RT experienced by the steering wheel 26 due to any forces induced by the components of the robotic driving system 20. Thus, the method of operating the robotic driving system 20 also further includes a step of calculating the resistive torque RT experienced by the steering wheel 26 based on the load signal and the known distance D from the steering axis 38 using the controller 76. For example, the resistive torque RT may be the product of the force F and the distance D; however, other methods of calculating the resistive torque RT are contemplated.

Additionally, the method of operating the robotic driving system 20 includes a step of determining a compensatory torque CT based on the resistive torque RT using the controller 76. To determine the compensatory torque CT, the method of operating the robotic driving system 20 may further include the steps of determining a current rotational speed of the steering wheel 26, and determining an operational mode of the controller 76 based on the current rotational speed of the steering wheel 26. The operational mode of the controller 76 may be selected from a dynamic operational mode and a static operational mode. The controller 76 may select the dynamic operational mode when the current rotational speed of the steering wheel 26 is sufficient to change the vehicle's 22 trajectory. For example, the controller 76 may select the dynamic operational mode when the robotic driving system 20 is rotating the steering wheel 26 at a rotational speed sufficient to direct the vehicle 22 into a parking spot, navigate the vehicle 22 around a corner, change the lane of the vehicle 22, etc. Conversely, the controller 76 may select the static operational mode when the current rotational speed of the steering wheel 26 is nominal such that the vehicle's 22 trajectory remains unchanged. For example, the controller 76 may select the static operational mode when the vehicle 22 is traveling straight down a straight road.

When the controller 76 is operating the robotic driving system 20 in the dynamic operational mode, the compensatory torque CT is determined based on an identified friction profile of the robotic driving system 20. Thus, is it necessary to ascertain the identified friction profile of the robotic driving system 20. To ascertain the identified friction profile, the controller 76 may initiate a friction identification routine. The friction identification routine may include the steps of applying an identification torque (not shown) to the steering wheel 26 using the steering motor 62 and calculating the identified friction profile based on the load signal corresponding to the force F during the friction identification routine using the controller 76. The identified friction profile may be indicative of any forces induced by the robotic driving system 20 throughout the rotational range of the steering wheel 26. Thus, when operating in the dynamic operational mode, as the steering wheel 26 is rotating, the controller 76 may determine the necessary compensatory torque CT to prevent the resistive torque RT experienced by the steering wheel 26 due to any forces induced by the components of the robotic driving system 20 from overriding the automated steering system 24.

When the controller 76 is operating the robotic driving system 20 in the static operational mode, the compensatory torque CT may be determined to be a value equal and opposite the resistive torque RT such that the compensatory torque CT counteracts the resistive torque RT. Therefore, the sum of torque experienced by the steering wheel 26 is controlled to zero when the controller 76 is operating the robotic driving system 20 in the static operational mode. Importantly, with the resistive torque RT counteracted, the automated steering system 24 is capable of urging the steering wheel of the vehicle in the proper direction to correct of the vehicle's 22 the trajectory without being unintentionally overridden.

To achieve this end, referring again to FIG. 16, the method of operating the robotic driving system 20 includes a step of adjusting the steering torque ST generated by the steering motor 62 based on the compensatory torque CT to compensate for any forces induced by the robotic driving system 20 for preventing an override of the automated steering system 24. In other words, prior to the controller 76 transmitting a motor signal to the steering motor 62 to generate the steering torque ST, the controller 76 may adjust the magnitude and/or direction of the desired steering torque ST in view of the calculated compensatory torque CT such that the robotic driving system 20 to internally compensates for any forces induced by its componentry to prevent overriding of the automated steering system 24.

It is contemplated that the controller 76 may operate the robotic driving system 20 in other operational modes. For example, the controller 76 may operate the robotic driving system 20 in a fully active mode. In the fully active mode, the robotic driving system 20 may rotate the steering wheel 26 to actively perform typical tasks associated with driving the vehicle 22 (e.g., directing the vehicle 22 into a parking spot, navigating the vehicle 22 around a corner, changing the lane of the vehicle 22, etc.) without regard to any forces induced by the componentry of the testing equipment. Also, for example, the controller 76 may operate the robotic driving system 20 in a fully passive mode. In the fully passive mode, the robotic driving system 20 may not apply any steering torque ST to the steering wheel 26 whatsoever, as to allow a driver to assume full control of the steering wheel 26, for example.

Several embodiments have been discussed in the foregoing description. However, the embodiments discussed herein are not intended to be exhaustive or limit the present disclosure to any particular form. The terminology which has been used is intended to be in the nature of words of description rather than of limitation. Many modifications and variations are possible in light of the above teachings and the present disclosure may be practiced otherwise than as specifically described.

What is claimed is:

1. A robotic driving system for rotating a steering wheel of a vehicle, the vehicle including an automated steering system, said robotic driving system comprising:
    a turntable defining a steering axis and configured to be mounted to the steering wheel of the vehicle such that said turntable and the steering wheel rotate concurrently about said steering axis;
    a robot frame including a support member and configured to be mounted to the vehicle;
    a transmission device coupled to said support member and operatively coupled to said turntable to transmit a steering torque to said turntable for rotating said turntable and the steering wheel;
    a steering motor in driving engagement with said transmission device to generate and apply said steering torque to said transmission device;
    a load sensor mounted between said support member and said transmission device at a known distance from said steering axis with said load sensor generating a load signal corresponding to a force experienced between said transmission device and said support member; and
    a controller in communication with said steering motor and said load sensor with said controller calculating a resistive torque experienced by said turntable based on said load signal and said known distance from said steering axis, and said controller determining a compensatory torque to be applied to said steering torque based on said resistive torque to compensate for forces induced by said robotic driving system for preventing an override of the automated steering system.

2. The robotic driving system of claim 1, wherein said transmission device includes a plurality of bearing members arranged to rotatably support said turntable for rotation about said steering axis.

3. The robotic driving system of claim 1, wherein said transmission device includes a drive member rotatably mounted to said turntable and operatively coupled to said steering motor to transmit said steering torque from said steering motor to said turntable for rotating said turntable and the steering wheel.

4. The robotic driving system of claim 3, wherein said drive member includes a first torque transfer interface and said turntable includes a second torque transfer interface, wherein said first torque transfer interface and said second torque transfer interface cooperate to transmit said steering torque from said steering motor to said turntable for rotating said turntable and the steering wheel.

5. The robotic driving system of claim 1, wherein said transmission device includes a transmission housing mounted to said load sensor and including a drive member partially disposed within said transmission housing.

6. The robotic driving system of claim 5, wherein said steering motor is operatively coupled to said drive member to transmit said steering torque from said steering motor to said turntable for rotating said turntable and the steering wheel.

7. The robotic driving system of claim 5, wherein said steering motor is mounted to and supported by said transmission housing.

8. The robotic driving system of claim 5, wherein said load sensor includes a first portion mounted to said support member, a second portion mounted to said transmission housing, and a load cell mounted between said first portion and said second portion to measure said force experienced between said transmission device and said support member and to generate said load signal.

9. The robotic driving system of claim 1, wherein said robot frame includes a base configured to be mounted to an interior of the vehicle.

10. The robotic driving system of claim 1, wherein said robot frame includes a base configured to be mounted to a floor of the vehicle.

11. The robotic driving system of claim 10, wherein said support member extends upwardly from said base toward said transmission device to support said transmission device.

12. The robotic driving system of claim 1, wherein said turntable includes one or more braces for mounting said turntable to the steering wheel.

13. The robotic driving system of claim 1, wherein said turntable comprises a plurality of portions separable from each other for positioning and mounting said turntable behind the steering wheel.

14. The robotic driving system of claim 1, further comprising an accelerator actuator mounted to said robot frame and configured to be coupled to and actuate an accelerator pedal of the vehicle.

15. The robotic driving system of claim 1, further comprising a brake actuator mounted to said robot frame and configured to be coupled to and actuate a brake pedal of the vehicle.

16. A method of operating a robotic driving system to rotate a steering wheel of a vehicle, the vehicle including an automated steering system, and the robotic driving system including a turntable defining a steering axis and mounted to the steering wheel, a robot frame mounted to the vehicle and including a support member, a transmission device coupled to the support member and operatively coupled to the turntable, a steering motor in driving engagement with the transmission device, a load sensor mounted between the support member and the transmission device at a known distance from the steering axis, and a controller in communication with the steering motor and the load sensor, said method comprising the steps of:
    generating a steering torque using the steering motor;
    applying the steering torque to the transmission device;
    generating a load signal corresponding to a force experienced between the transmission device and the support member;
    calculating a resistive torque experienced by the steering wheel based on the load signal and the known distance from the steering axis using the controller;
    determining a compensatory torque based on the resistive torque using the controller; and
    adjusting the steering torque generated by the steering motor based on the compensatory torque to compensate for forces induced by the robotic driving system for preventing an override of the automated steering system.

17. The method of claim 16, further comprising the steps of:
    determining a current rotational speed of the steering wheel; and
    determining an operational mode of the controller based on the current rotational speed of the steering wheel, wherein the operational mode is selected from:
        a dynamic operational mode when the current rotational speed of the steering wheel is sufficient to change the vehicle's trajectory; and
        a static operational mode when the current rotational speed of the steering wheel is nominal such that the vehicle's trajectory remains unchanged.

18. The method of claim 17, wherein the step of determining the compensatory torque is further defined as determining the compensatory torque based on an identified friction profile of the robotic driving system when operating in the dynamic operational mode.

19. The method of claim 18, further comprising the step of ascertaining the identified friction profile by initiating a friction identification routine, the friction identification routine including the steps of:
   applying an identification torque to the steering wheel using the steering motor; and
   calculating the identified friction profile based on the load signal during the friction identification routine using the controller.

20. The method of claim 17, wherein the step of determining the compensatory torque is further defined as determining the compensatory torque to be a value equal and opposite the resistive torque such that the resistive torque is counteracted by the compensatory torque when operating in the static operational mode.

* * * * *